(12) United States Patent
Andersson et al.

(10) Patent No.: US 8,640,443 B2
(45) Date of Patent: Feb. 4, 2014

(54) EXHAUST GAS AFTER TREATMENT SYSTEM (EATS)

(75) Inventors: Lennart Andersson, Varberg (SE); Lucas Megas, Göteborg (SE); Jonas Edvardsson, Mölndal (SE); Carl-Johan Karlsson, Göteborg (SE); Anders Tuomivaara, Göteborg (SE); Jonas Jansson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 472 days.

(21) Appl. No.: 12/528,089

(22) PCT Filed: Feb. 21, 2008

(86) PCT No.: PCT/SE2008/000147
§ 371 (c)(1), (2), (4) Date: Nov. 15, 2009

(87) PCT Pub. No.: WO2008/103110
PCT Pub. Date: Aug. 28, 2008

(65) Prior Publication Data
US 2010/0126151 A1    May 27, 2010

(30) Foreign Application Priority Data
Feb. 21, 2007  (SE) .................................... 0700438

(51) Int. Cl.
*F01N 3/035* (2006.01)
(52) U.S. Cl.
USPC .................... 60/286; 60/295; 60/297; 60/301
(58) Field of Classification Search
USPC ............................. 60/286, 295, 297, 301, 303
See application file for complete search history.

(56) References Cited

U.S. PATENT DOCUMENTS

| | | | |
|---|---|---|---|
| 6,753,294 B1* | 6/2004 | Brisley et al. | 502/439 |
| 2006/0153761 A1* | 7/2006 | Bandl-Konrad et al. | 423/239.1 |

(Continued)

FOREIGN PATENT DOCUMENTS

| | | |
|---|---|---|
| DE | 10243488 A1 | 4/2004 |
| DE | 102005036712 A1 | 2/2007 |

(Continued)

OTHER PUBLICATIONS

European Search Report for corresponding European App. EP 08 71 2734.

(Continued)

*Primary Examiner* — Kenneth Bomberg
*Assistant Examiner* — Jonathan Matthias
(74) *Attorney, Agent, or Firm* — WRB-IP LLP (57) ABSTRACT

An exhaust gas after treatment system includes a diesel particulate filter unit arranged downstream of a diesel engine, a NO2 reduction catalyst arranged downstream of said diesel particulate filter, a selective catalytic reduction (SCR) arrangement arranged downstream of said NO2 reduction catalyst, a first injector for feeding reducing agent into the exhaust gas arranged downstream said particulate filter and upstream said NO2 reduction catalyst, a second injector for feeding reducing agent into the exhaust gas arranged downstream said NO2 reduction catalyst and upstream said selective catalytic reduction (SCR) arrangement. An exhaust gas after treatment method is also provided.

20 Claims, 4 Drawing Sheets

(56) References Cited

U.S. PATENT DOCUMENTS

| | | | |
|---|---|---|---|
| 2006/0213187 A1* | 9/2006 | Kupe et al. | 60/286 |
| 2008/0155968 A1* | 7/2008 | Salemme et al. | 60/288 |
| 2008/0213145 A1* | 9/2008 | O'Sullivan et al. | 423/213.5 |
| 2008/0271438 A1* | 11/2008 | Hinz et al. | 60/286 |

FOREIGN PATENT DOCUMENTS

| | | | |
|---|---|---|---|
| EP | 1054722 B1 | 12/2001 | |
| JP | 2006207512 A | 8/2006 | |
| SE | 0402499 A * | 2/2006 | |
| WO | 0112320 A1 | 2/2001 | |
| WO | 2004071646 A2 | 8/2004 | |
| WO | 2006040533 A1 | 10/2005 | |
| WO | WO 2006040533 A1 * | 4/2006 | B01D 53/94 |

OTHER PUBLICATIONS

International Search Report for corresponding International Application PCT/SE2008/000147.

International Preliminary Report on Patentability for corresponding International Application PCT/SE2008/000147.

* cited by examiner

EXHAUST GAS AFTER TREATMENT SYSTEM (EATS)

BACKGROUND AND SUMMARY

The present invention relates to a method and apparatus for purifying exhaust gases from a diesel engine, more particularly the present invention relates to a method and apparatus for purifying exhaust gases from a diesel engine which is capable of removing particulates and NOx contained in the exhaust gases.

Present regulatory conditions in the automotive market have led to an increasing demand to improve fuel economy and reduce emissions in present vehicles. These regulatory conditions must be balanced with the demands of a consumer for high performance and quick response for a vehicle.

A diesel engine has an efficiency of up to about 52% and is thus the best converter of fossil energy. NOx emission concentration is dependent upon local oxygen atom concentration and the local temperature. Said high efficiency is however only possible at an elevated combustion temperature at which high NOx levels are inevitable. Moreover, a suppression of NOx formation by internal means (air/fuel ratio) has the tendency to cause an increase in particulates, known as the NOx-particulates trade off. Furthermore, an excess of oxygen in the exhaust gas from a diesel engine prevents the use of stoichiometric 3-way-catalyst technology for reduction of NOx as is used in gasoline engine cars from the late 80-ties. Reducing the oxides of nitrogen (NOx) and particulate matter (PM) in exhaust gases from a diesel engine has become a very important problem in view of the protection of environment and the saving of finite fossil energy supply. For the coming legislation (US10, EU V1 etc) it may be necessary to have a combination of a diesel oxygen catalyst (DOC), a diesel particulate filter (DPF) and a selective catalytic reduction (SCR) catalyst in the exhaust system. When designing the DOC and the DPF for a combined system, the noble metal loading is generally a compromise. Good NO-oxidation (i.e. good passive regeneration) and good HC-oxidation (i.e. good O2-regeneration and exhaust after treatment system (EATS) heating) require high noble metal loading. However, a too high noble metal loading (i.e. too high NO-oxidation) will decrease NOx-conversion efficiency in the SCR, and also lead to emissions of the green house gas N2O. When taking into account that the NO- and HC-oxidation must be sufficient also for an aged catalyst, this problem becomes even greater. In the end, if high SCR-activity is needed on the fresh system (for e.g. certification), the aged NO- and HC oxidation will be less than optimal.

Today the catalyst specification is a compromise and the engine parameters are set to fulfil the certification cycle regarding NOx. In JP 2006207512 a DOC bypass (without DPF) is described, which is controlled by the temperature of the DOC. With a bypass solution a higher passive regeneration and a higher SCR efficiency is possible than with the compromise, however the NO2 amount into DPF is still dependent upon the needed NO2/NOX ratio into the SCR.

As explained above, there is a problem associated with prior art methods and—apparatuses for purifying exhaust gases from a diesel engine.

The object of the invention is to provide an exhaust gas after treatment system and method which at least reduce the above mentioned problems.

The objects are achieved by the features of the independent claims. The other claims and the description disclose advantageous example embodiments of the invention.

According to a first aspect of the invention an exhaust gas after treatment system comprising a diesel particulate filter unit (DPFU) arranged downstream of a diesel engine. A NO2 reduction catalyst arranged downstream of said DPFU. A selective catalytic reduction (SCR) arrangement arranged downstream of said NO2 reduction catalyst. A first injector for feeding reducing agent into the exhaust gas arranged downstream said particulate filter and upstream said NO2 reduction catalyst. A second injector for feeding reducing agent into the exhaust gas arranged downstream said NO2 reduction catalyst and upstream said selective catalytic reduction (SCR) arrangement.

An advantage with the present invention is that it allows high noble metal loading on the DOC and/or the DPF resulting in good NO- and HC-oxidation and at the same time as an optimal NO2/NO ratio may be achieved for the SCR.

Another advantage with the present invention is that one may achieve high passive regeneration and HC oxidation in the DPF system and maintaining a good NO2/NO ratio for high NOx-conversion in the SCR-system for a fresh as well as an aged system.

Another advantage with the present invention is that it will be possible to use a smaller SCR-catalyst, giving both cost, space and weight benefits.

In yet another example embodiment of the present invention said DPF is coated with an oxidation catalyst material. An advantage with this embodiment is that one will still further save space, cost and weight.

The DPFU may have the DOC upstream of the DPF.

In still another example embodiment a heat generator is provided between said internal combustion engine and the DPF or DPFU. An advantage with this embodiment is that one may control the temperature in the EATS in an appropriate manner, for instance to suppress or activate one or more of the reactions taking place in the EATS.

The heat generator may consist of a DOC able to convert fuel to carbon dioxide and water. The heat generator may consist of a burner. A NO2 sensor may be provided downstream and/or downstream the NO2 reduction catalyst. The NO2 sensor may be a virtual sensor. The NO2 reduction catalyst may be applied as a zone coating on the DPF and said first injector may be arranged upstream said zone coating. The NO2 reduction catalyst may be arranged as a zone coating on the SCR arrangement and said first and second injector may be provided as a single unit arranged downstream said DPFU and upstream of said NO2 reduction catalyst and SCR arrangement.

According to another aspect of the present invention an exhaust gas after treatment method comprising the actions of: oxidizing NO into NO2 and trapping combustion particles in a diesel particulate filter unit (DPFU) arranged in direct fluid communication with an internal combustion engine, regulating NO2 content in a NO2 reduction catalyst arranged downstream of said (DPFU), reducing NO2 into NO in a selective catalytic reduction (SCR) arrangement arranged downstream of said NO2 reduction catalyst, injecting a reducing agent by a first injector into the exhaust gas arranged downstream said DPFU and upstream said NO2 reduction catalyst, injecting a reducing agent by a second injector into the exhaust gas arranged downstream said NO2 reduction catalyst and upstream said selective catalytic reduction SCR arrangement.

According to another aspect of the invention a computer program storable on a computer readable medium, comprising a program code for use in a method comprising at least the steps of the exhaust gas after treatment method.

This computer program can be adapted to be downloaded to a support unit or one of its components when run on a computer which is connected to the internet.

BRIEF DESCRIPTION OF THE DRAWINGS

With reference to the appended drawings below follows a more detailed description of embodiments of the invention cited as examples.

In the drawings.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

Figure 1:
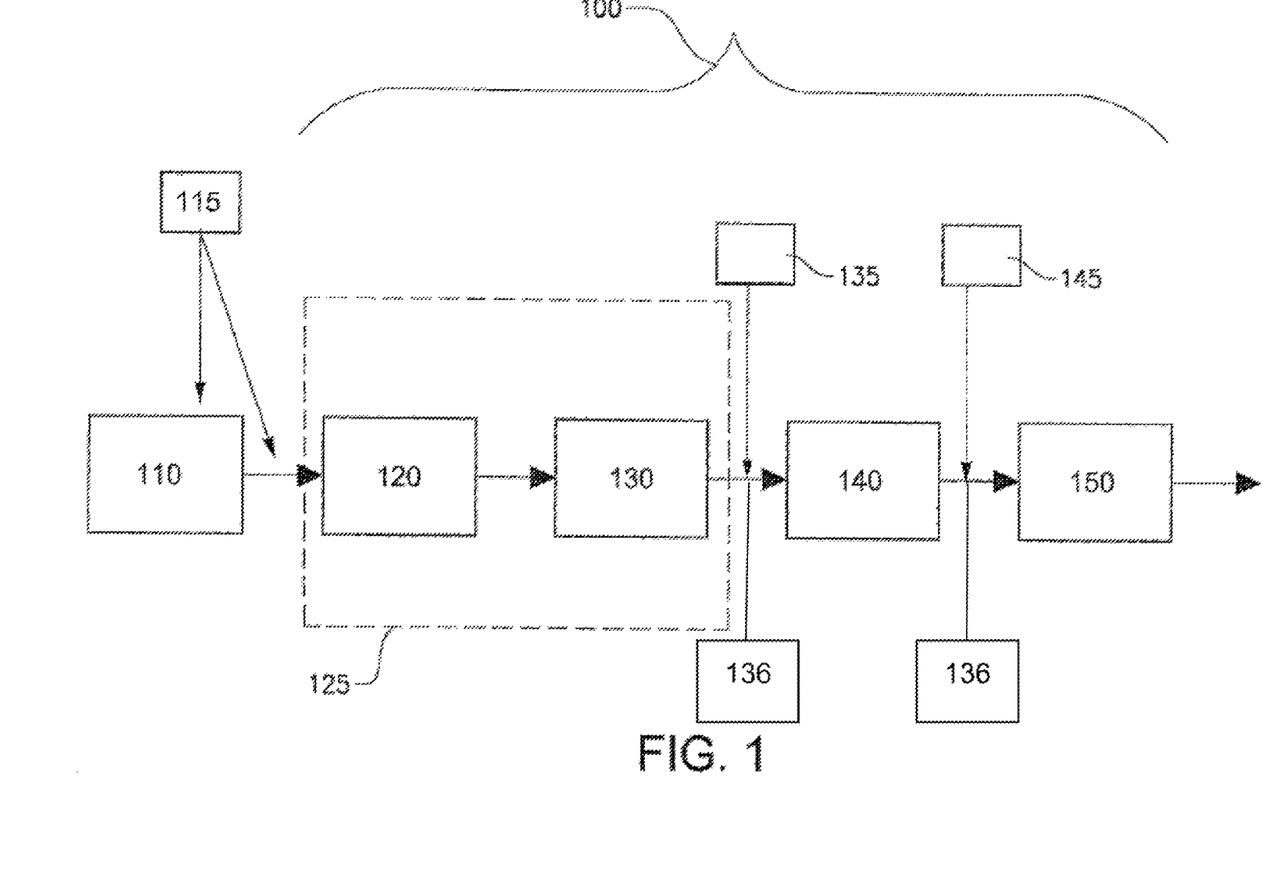
FIG. 1 shows a schematic illustration of a first example embodiment of an exhaust gas aftertreatment system according to the present invention in fluid connection with an internal combustion engine.

In FIG. 1 a first example embodiment of an exhaust gas after treatment system (EATS) 100 according to the present invention is schematically illustrated. Said EATS is fluidly connected to an internal combustion engine 110, e.g., a diesel engine. Said EATS 100 comprising a diesel particulate filter unit (DPFU) 125, a NO2 reduction catalyst 140, a selective catalytic reduction (SCR) 150, a first reductant injector 135 and a second reductant injector 145.

The diesel particulate filter unit 125 is in direct fluid communication with the internal combustion engine 110. Said diesel particulate filter unit 115 comprises a diesel oxidation catalyst (DOC) 120 and a diesel particulate filter (DPF) 130. The DOC 120 is in this embodiment arranged upstream of said DPF 130. The reaction taking place in the DOC 120 may be as follows:

$$NO + \tfrac{1}{2}O_2 \rightarrow NO_2 \tag{1}$$

The temperature in the DOC 120 is depending inter alia of catalyst material; HC, CO and O2 content and mass flow. The catalytic reaction may start in DOC 120 at about 2000 C and may have its maximum catalytic reaction temperature of about 300-4000 C. After reaching the maximum reaction temperature the reaction may decline, which declining is depending on the equilibrium reaction, where the reverse reaction $$NO_2 \rightarrow \tfrac{1}{2}O_2 + NO \tag{2}$$

is more temperature dependent than equation (1).

The DOC 120 is usually built up in the form of a monolithic structure made of cordierite or metal. Said monolithic structure may be coated with a catalytic material in the form of a base metal oxide and a precious metal, which could be Platinum and/or Palladium.

The reaction taking place in the DPF (130) may be as follows:

$$2NO_2 + C \rightarrow NO + CO_2 \tag{3}$$

The temperature in the DPF 130 may be affected by the thickness of the soot layer in the DPF 130 and may be as low as about 2000 C, but becomes effective above 2500 C. At higher temperatures than about 7000 C1 the aging of the DPF 130 as such and the catalyst(s) arranged downstream said DPF 130 may be heavily affected.

The DPF 130 may be built up from porous forms of cordierite or silicon carbide or sintered metal powder. Said porous form may be coated with a catalytic material in the form of a base metal oxide and a precious metal, which could be Platinum and/or Palladium.

If too much soot is trapped in the DPF 130, which may be caused by a too low temperature and/or to low NOx/soot from the engine, one may use a heat generator upstream said DPF 130 in order to heat the DPF 130 to an appropriate working temperature. Said heat generator may take different forms. In a first example embodiment the temperature in the DPF 130 may be raised on demand by post-injection of diesel into one or more cylinders of the internal combustion engine 110 and/or post-injection of diesel into the exhaust system upstream of said DOC 120, denoted by 115 in FIG. 1. The reaction in the DOC 120 may under such circumstances be as depicted by equation (4) instead of the equation as depicted above by (1):

$$3O_2 + 2CH_2 \rightarrow 2CO_2 + 2H_2O \tag{4}$$

The temperature of the reaction (4) depends inter alia of the content of HC. It may start at 2000 C for reaching DOC outlet temperature of about 3500 C and may start at 2800 C for reaching a peak temperature of 6000 C.

The catalytic material and/or the temperature in the DOC 120 affect which one of the equations (1) or (4) is dominating. One may optimize for reaction No. (4), if the purpose of DOC 120 is to increase the temperature of the exhaust gases and one may optimize for reaction No. (1), if the purpose of the DOC 120 is to produce NO2.

Another example of heat generators may be electric heated catalyst.

If the Nox/soot is high it is only required to increase of the temperature in the DOC 120 to about 4000 C for removing SOx which prohibits reaction No (1).

Another reaction taking place in the DPF 130 is as follows:

$$O_2 + C \rightarrow CO_2 \tag{5}$$

The temperature of reaction (5) is about 6OQ0 C, which may be somewhat decreased if the filter is coated with catalyst or if the fuel is added with catalyst to about 4500 C. The lower temperature may necessitate a catalyst material added to the fuel, which in turn is adsorbed by the soot particles.

Downstream said DPF 130 said NO2 reduction catalyst 140 is arranged. In said NO2 reduction catalyst 140 the following reactions may take place:

$$2NO_2 + CH_2 \rightarrow NO + CO + H_2O \tag{6}$$

$$3NO_2 + CH_2 \rightarrow NO + CO_2 + H_2O \tag{7}$$

From reactions No. (6) and (7) it is clear that the NO2 reduction catalyst 140 reduces NO2 into NO. Without the NO2 reduction catalyst 140 it is a trade-off between optimal passive regeneration and HC oxidation in the DOC 120/DPF 130 and high NOx-conversion in the SCR system 150. By adding the NO2 reduction catalyst 140 downstream of the DPF 130 such trade-off problem may be solved. The NO2 reduction catalyst 130 acts as a balancer to balance the ratio of NO2/NO into the SCR 150. The NO2 reduction catalyst 140 will allow high noble metal loading on the DOC 120 and/or DPF 130 (good NO- and HC-oxidation) at the same time as an optimal NO2/NO ratio may be achieved for the SCR 150. A reducing agent such as fuel (HC based fuel such as diesel) or urea may be added, denoted by 135 upstream of said NO2 reduction catalyst 140 for obtaining the NO2→NO reduction.

The amount of HC injected to the NO2 reduction catalyst 140 can be controlled to produce desired NO2/NO ratio with a signal from a NO2 sensor 136 placed before and/or after the NO2 reduction catalyst 140. The NO2 sensor(s) can be replaced by a virtual NO2 sensor.

With the NO2 reduction catalyst 140 it may also be possible to have optimal passive regeneration and HC-oxidation for an aged SCR system 150 while still maintaining high NOx-conversion for the fresh systems. It will also be possible to use a smaller SCR-catalyst 150, giving both cost, space and weight benefits.

The temperature in the NO2 reduction catalyst 140 may be from about 2500 C to about 6000 C, more details can be found in WO 2006/040533. The NO2 reduction catalyst 140 may be based on a zeolite material, more details can be found in WO 2006/040533.

The SCR 150 is in this embodiment arranged downstream said NO2 reduction catalyst 140. The reactions that may take place in the SCR 150 may be as follows:

$$4NO+4NH_3+O_2 \rightarrow 4N_2+6H_2O \quad (8)$$

$$2NO+2NO_2+4NH_3 \rightarrow 4N_2+6H_2O \quad (9)$$

$$6NO_2+8NH_3 \rightarrow 7N_2+12H_2O \quad (10)$$

$$4NO_2+4NH_3 \rightarrow 2N_2+2N_2O+6H_2O \quad (11)$$

Because reaction No. (9) is the fastest reaction of reactions (8)-(11) and to avoid reaction No. (11), one wants to keep the ratio of NO/NO2 of about 50:50.

Reaction No (9) may be effective in a temperature range in the SCR 150 from about 2000 C and higher, the reaction starts however at much lower temperatures but the lower the temperature the slower the reaction. The starting temperature for reaction No (8) in the SCR 150 may be about 250° C. Starting points and temperature ranges is somewhat affected by the choice of catalytic material in the SCR 150.

The SCR 150 may be built up in the form of a monolithic structure made of cordierite or metal. Said structure may either be coated with Vanadium oxide on top of a titanium oxide comprising some amount of wolfram oxide or a coating comprising zeolite. The zeolite may comprise some iron or copper content or some other appropriate anti ion. There are also vanadium oxide catalysts which are extruded to monolithic structures, i.e., the catalyst and structure is made of the same material.

In the embodiment as illustrated in FIG. 1, an injector 145 is arranged between the NO2 reduction catalyst 140 and the SCR 150. Said injector injects a reductant material upstream of said SCR 150. The reductant material may be urea, ammonia, ammonia absorbed in water, ammonium carbonate, or metal chloride salts which may adsorb ammoniac.

Figure 2:
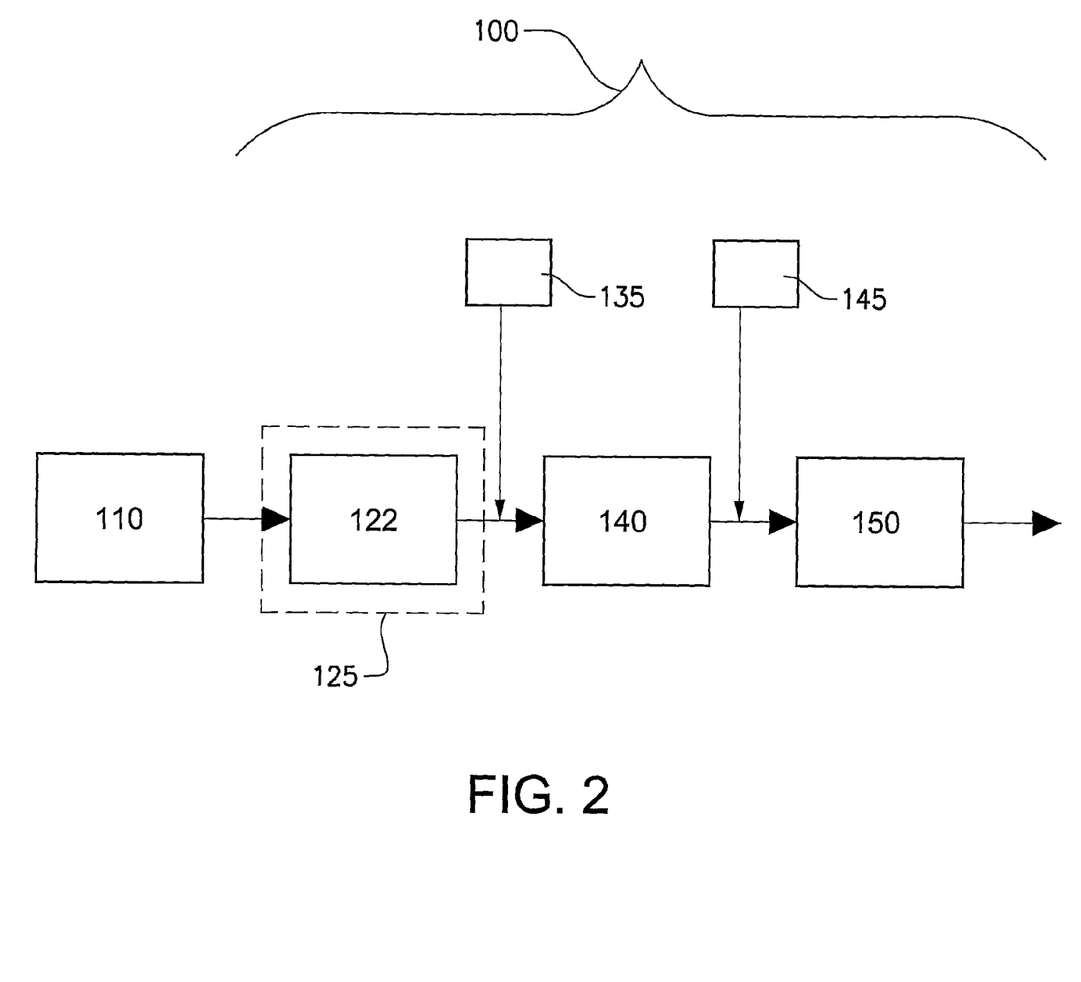
FIG. 2 shows a schematic illustration of a second example embodiment of an exhaust gas aftertreatment system according to the present invention in fluid connection with an internal combustion engine.

FIG. 2 illustrates another example embodiment of the exhaust gas after treatment system (EATS) 100 according to the present invention. Said embodiment only differs to the preceding embodiment in that the DPFU 125 comprises a DPF coated with a DOC material 122 instead of as in FIG. 1 where said DOC 120 and DPF 130 were separate units. The other features uses same reference numbers as I FIG. 1 and needs therefore no further clarification since the functionality and structure may be the same. Another difference to the embodiment as illustrated in FIG. 1 is that the injector 115 has been omitted. Clearly, said injector 115 could also be omitted from the embodiment as depicted in FIG. 1, i.e., the injector 115 in FIG. 1 is optional.

The reaction taking place in the DPFU 125 in FIG. 2 is similar to the reaction taking place in the DPF 130 and DOC 120 as illustrated in FIG. 1, i.e. reactions No. (1) and (3).

Figure 3:
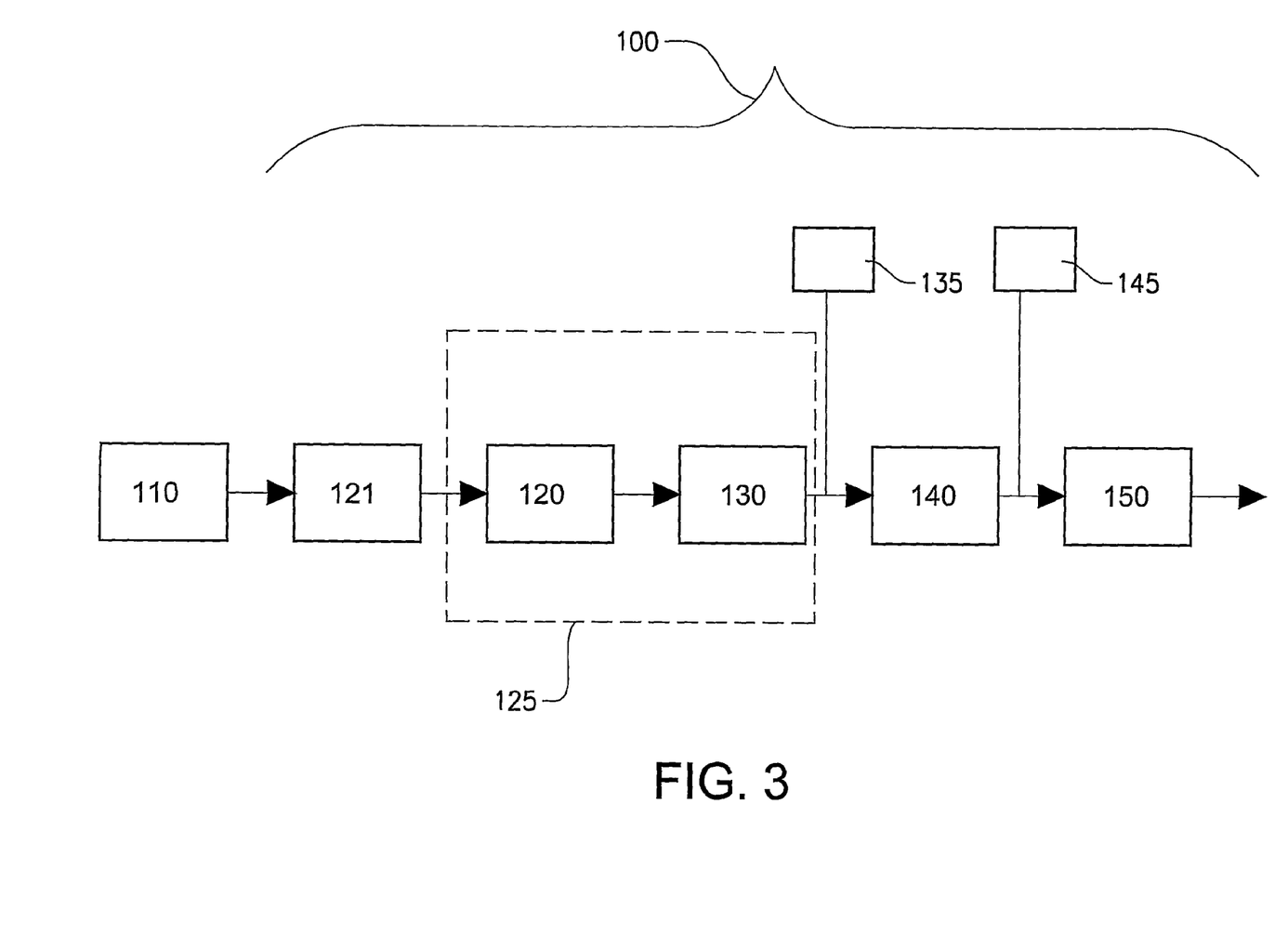
FIG. 3 shows a schematic illustration of a third example embodiment of an exhaust gas aftertreatment system according to the present invention in fluid connection with an internal combustion engine.

In FIG. 3 it is illustrated another example embodiment of the exhaust gas after treatment system (EATS) 100 according to the present invention. This embodiment differs to the one depicted in FIG. 1 in that a separate heat generator 121 is arranged between the internal combustion engine 110 and the DOC 120. Here, similar to the embodiment in FIG. 2, the injector 115 has been omitted. Said separate heat generator 121 may comprise of a diesel burner, or an adjustable restrictor in the exhaust system upstream of said DOC 120.

Figure 4:
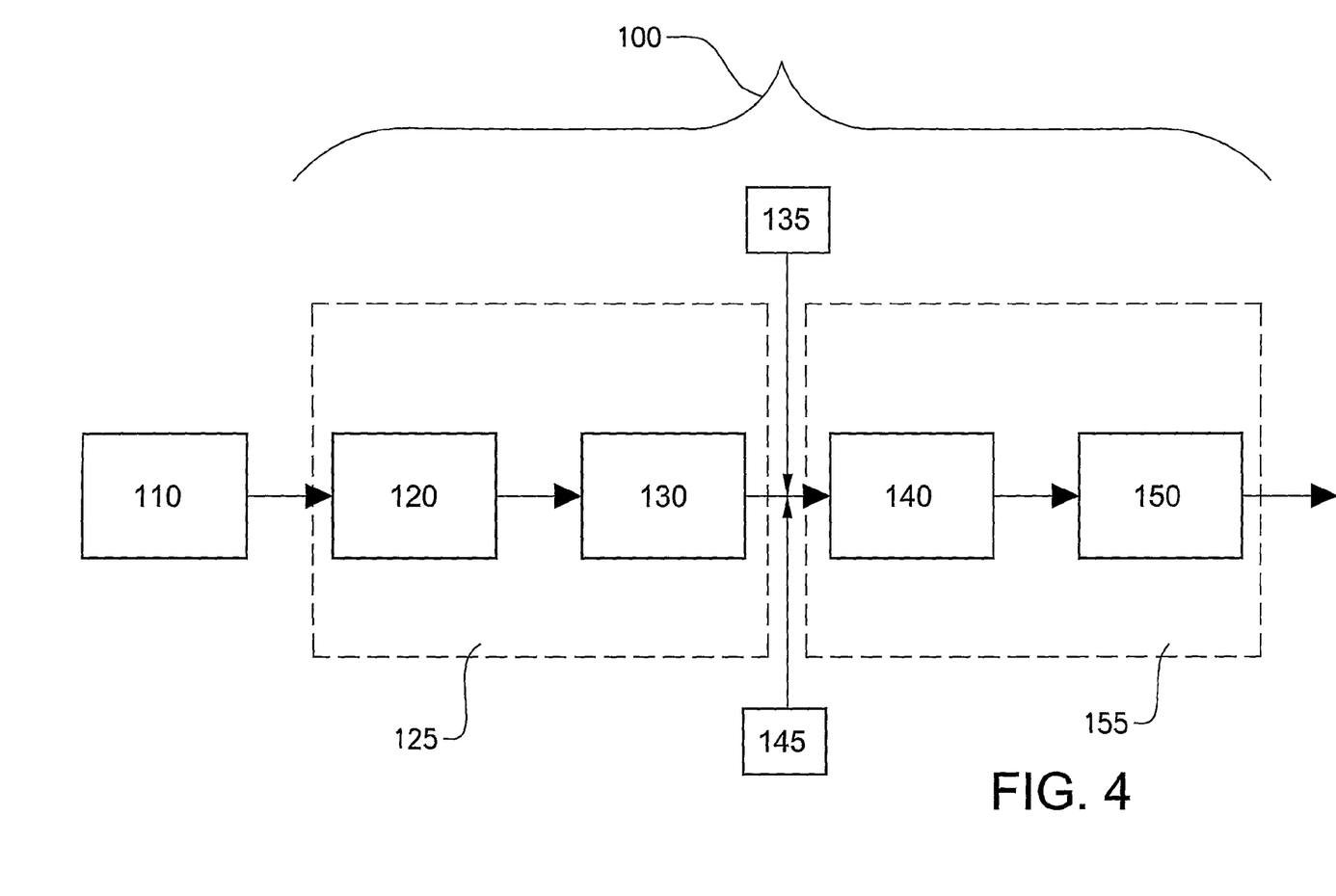
FIG. 4 shows a schematic illustration of a fourth example embodiment of an exhaust gas aftertreatment system according to the present invention in fluid connection with an internal combustion engine.

FIG. 4 illustrates yet another example embodiment of the exhaust gas after treatment system (EATS) 100 according to the present invention. This embodiment differs to the embodiment illustrated in FIG. 1 in that the NO2 reduction catalyst 140 and the SCR 150 are arranged as a combined unit. In one embodiment said NO2 reduction catalyst 140 is arranged as a zone coating on a SCR substrate, i.e., at least a first part of the SCR substrate may be coated with NO2 reduction catalyst material and at least a second part of said SCR substrate may be coated with SCR catalyst material. The order of zone coatings of NO2 and SCR catalyst material may be changed. In one embodiment there is a first zone of NO2 catalyst coating upstream of a second zone of SCR coating. In another embodiment there is a plurality of NO2 coating spaced apart from each other in between which there are provided SCR coatings.

In yet another example embodiment said NO2 reduction catalyst material may be arranged as a zone coating on a DPF substrate i.e., at least a first part of the DPF substrate may be coated with DOC reduction catalyst material and at least a second part of said DPF substrate may be coated with NO2 catalyst material. The order of zone coatings of NO2 and DOC catalyst material may be changed. In one embodiment there is a first zone of DOC catalyst coating upstream of a second zone of NO2 coating. In another embodiment there is a plurality of DOC coating spaced apart from each other in between which there are provided NO2 coatings.

In still another example embodiment of the present invention there is a combination of a NO2 catalyst zone coating on the DPF substrare and a NO2 catalyst zone coating on the SCR substrate. Such NO2 coating may be provided as a single zone or plurality of zones on one or both of said DPF and/or SCR units.

It is to be understood that the present invention is not limited to the embodiments described above and illustrated in the drawings; rather, the skilled person will recognize that many changes and modifications may be made within the scope of the appended claims.

The invention claimed is:

1. An exhaust gas after treatment system comprising
a diesel particulate filter unit (DPFU) arranged downstream of a diesel engine,
a NO2 to NO reduction catalyst arranged downstream of the DPFU, a selective catalytic reduction (SCR) arrangement arranged downstream of the NO2 to NO reduction catalyst, a first injector for feeding reducing agent into the exhaust gas arranged downstream of the DPFU and upstream of the NO2 to NO reduction catalyst, a second injector for feeding reducing agent into the exhaust gas arranged downstream of the NO2 to NO reduction catalyst and upstream of the selective catalytic reduction (SCR) arrangement, and a NO2 sensor at least one of upstream and downstream of the NO2 to NO reduction catalyst.

2. The exhaust has after treatment system according to claim 1, wherein the DPFU is a diesel particulate filter (DPF) coated with an oxidation catalyst.

3. The exhaust gas after treatment system according to claim 1, wherein the DPFU comprises a diesel oxidation catalyst (DOC) capable of converting NO to NO2 upstream of a diesel particulate filter (DPF).

4. The exhaust gas after treatment system according to claim 1, wherein a heat generator is provided between the diesel engine and the DPFU.

5. The exhaust gas after treatment system according to claim 4, wherein the heat generator consists of a DOC able to convert fuel to carbon dioxide and water.

6. The exhaust gas after treatment system according to claim 4, wherein the heat generator consists of a burner.

7. The exhaust gas after treatment system according to claim 4, wherein the NO2 sensor is placed downstream of the NO2 to NO reduction catalyst.

8. The exhaust gas after treatment system according to claim 7, wherein the NO2 sensor is a virtual NO2 sensor.

9. An exhaust gas after treatment system arranged downstream of a diesel engine, the system comprising:
a diesel oxidation catalyst (DOC) capable of converting NO to NO2 upstream of a diesel particulate filter (DPF)
a NO2 to NO reduction catalyst applied as a zone coating on the DPF,
a selective catalytic reduction (SCR) arrangement arranged downstream of the NO2 to NO reduction catalyst,
a first injector arranged upstream of the zone coating,
a second injector for feeding reducing agent into the exhaust gas arranged downstream of the NO2 to NO reduction catalyst and upstream of the selective catalytic reduction (SCR) arrangement, and
a NO2 sensor at least one of upstream and downstream of the NO2 to NO reduction catalyst.

10. An exhaust gas after treatment method comprising:
oxidizing NO into NO2 and trapping combustion particles in a diesel particulate filter unit (DPFU) arranged in direct fluid communication with an internal combustion engine,
regulating NO2 content in a NO2 to NO reduction catalyst arranged downstream of the (DPFU),
reducing NO and NO2 into N2 and H2O in a selective catalytic reduction (SCR) arrangement arranged downstream of the NO2 to NO reduction catalyst,
sensing an amount of NO2 at least one of upstream and downstream of the NO2 to NO reduction catalyst,
determining a desired NO2/NO ratio;
injecting, a reducing agent by a first injector into the exhaust gas arranged downstream of the DPFU and upstream of the NO2 to NO reduction catalyst until the desired NO2/NO ratio is achieve, and
injecting a reducing agent by a second injector into the exhaust gas arranged downstream of the NO2 to NO reduction catalyst and upstream of the selective catalytic reduction SCR arrangement.

11. The exhaust gas after treatment method according to claim 10, further comprising coating a diesel particulate filter (DPF) with an oxidation catalyst material.

12. The exhaust gas after treatment method according to claim 10, further comprising providing a diesel oxidation catalyst (DOC) capable of converting the NO to NO2 upstream of a diesel particulate filter (DPF) capable of trapping the combustion particles.

13. The exhaust gas after treatment method according to claim 10, further comprising providing a heat generator between the diesel engine and the DPFU.

14. The exhaust gas after treatment method according to claim 13, wherein the heat generator consists of a diesel oxidation catalyst (DOC) able to convert fuel to carbon dioxide and water.

15. The exhaust gas after treatment method according to claim 13, wherein the heat generator consists of a burner.

16. The exhaust gas after treatment method according to claim 10, further comprising providing the NO2 sensor downstream of the NO2 to NO reduction catalyst.

17. The exhaust gas after treatment method according to claim 16, wherein the NO2 sensor is replaced with a virtual NO2 sensor.

18. A non-transitory computer readable memory on a tangible medium comprising a computer program that, when executed, performs the method as claimed in claim 10.

19. An exhaust has after treatment method for an internal combustion engine, the method comprising:
providing a diesel oxidation catalyst (DOC) capable of converting the NO to NO2 upstream of a diesel particulate filter (DPF) capable of trapping the combustion particles,
regulating NO2 content in a NO2 to NO reduction catalyst applied as a zone coating on the DPF,
reducing NO and NO2 into N2 and H2O in a selective catalytic reduction (SCR) arrangement arranged downstream of the NO2 to NO reduction catalyst,
sensing an amount of NO2 at least one of upstream and downstream of the NO2 to NO reduction catalyst,
determining a desired NO2/NO ratio;
injecting a reducing agent by a first injector upstream of the zone coating until the desired NO2/NO ratio is achieved, and
injecting a reducing agent by a second injector into the exhaust gas arranged downstream of the NO2 to NO reduction catalyst and upstream of the selective catalytic reduction SCR arrangement.

20. An exhaust gas after treatment method for an internal combustion engine, the method comprising:
providing a diesel oxidation catalyst (DOC) capable of converting the NO to NO2 upstream of a diesel particulate filter (DPF) capable of trapping the combustion particles,
regulating NO2 content in a NO2 to NO reduction catalyst applied as a zone coating on a selective catalytic reduction (SCR) arrangement and as a zone coating on the DPF,
reducing NO and NO2 into N2 and H2O in the SCR arrangement arranged downstream of the NO2 to NO reduction catalyst,
sensing an amount of NO2 at least one of upstream and downstream of the NO2 to NO reduction catalyst,
determining a desired NO2/NO ratio;
injecting a reducing agent by a first injector upstream of the NO2 to NO reduction catalyst zone coating, on the DPF until the desired NO2/NO ratio is achieved, and injecting a reducing agent by a second injector into the exhaust gas arranged downstream of the NO2 to NO reduction catalyst and upstream of the selective catalytic reduction SCR arrangement.

* * * * *